Patented Oct. 21, 1941

UNITED STATES PATENT OFFICE 2,259,481

TREATED PIGMENTS AND METHOD OF MAKING

Kenneth S. Mowlds, Baltimore, Md., assignor to The Glidden Company, Cleveland, Ohio, a corporation of Ohio No Drawing. Application April 24, 1939,
Serial No. 269,785

17 Claims. (Cl. 106—295)

The present invention is directed to the treatment of pigments and particularly relates to the treatment of pigments to improve their hiding power.

In co-pending application Serial No. 175,246, filed November 18, 1937 there is disclosed a treatment of a base pigment with soluble silicates followed by a precipitation of the silicate in insoluble form by means of a precipitating salt and acids. This treatment results in a marked increase in hiding power of the pigment. It has been noted, however, that pigments treated in this manner, show an increased tendency to settle when used in paints and similar formulations. Also, in the case of sulfide pigments there is a tendency toward discoloration when the pigment is used with driers such as lead driers, due to the formation of lead or other colored sulfides.

According to the present invention the pigment containing a product obtainable by the reaction of a soluble silicate and a salt capable of precipitating the same in insoluble form is treated to greatly decrease the settling tendency of the pigment, and to retard the discoloration, and improve other properties of the pigment.

In effecting precipitation of the silicate the usual precipitants are alkaline earth metal salts, such as salts of calcium, barium, magnesium, etc., zinc salts, aluminum salts, etc., whereby a silicate is produced containing the oxide of the alkaline earth metal, zinc or aluminum contained in the precipitating salt. According to the present invention those oxides present in the precipitate which are convertible into carbonates are converted into the carbonates with the result that the settling tendency is greatly improved and the discoloration and other properties improved.

The reaction taking place may be represented by the following equations, in which the soluble silicate used is sodium silicate and the precipitating salt is calcium chloride. These equations, however, are only representative, and are advanced as illustrative of the reactions which may take place, it being understood that other silicates and salts react in a similar manner.

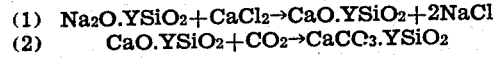

(1) $Na_2O.YSiO_2 + CaCl_2 \rightarrow CaO.YSiO_2 + 2NaCl$
(2) $CaO.YSiO_2 + CO_2 \rightarrow CaCO_3.YSiO_2$ In giving the formulae above for the $SiO_2$ compounds it is not intended to indicate that they are necessarily definite chemical compounds, but rather to indicate the composition and in the case of the reaction products to indicate the composition of the reaction product produced. Thus the notation $CaCO_3.YSiO_2$ is used to indicate the reaction product formed by treating the precipitate of Equation 1 with carbon dioxide, and is not intended to necessarily indicate a definite chemical compound. Y represents the molecular ratio of $SiO_2$ to $CaO$ or $Na_2O$ or $CaCO_3$.

Accordingly the present invention contemplates a treatment of the pigment containing the precipitated silicate with carbon dioxide gas whereby the alkaline earth metal, zinc or similar metal oxide moiety of the precipitate is converted into the corresponding carbonate. This carbonation may be effected in numerous ways, and preferably is carried out in the presence of moisture which catalyzes the reaction. The carbonation may be carried out by passing carbon dioxide gas through a slurry of the treated pigment, by drying or calcining the filter cake of the treated pigment in a direct fired drier or calciner containing carbon dioxide, by subjecting the wet filter cake to carbon dioxide gas or by other suitable expedients. The dried silicate treated but uncarbonated pigment may be treated with carbon dioxide gas if desired but the reaction is slower than when moisture is present.

The following examples are illustrative:

Example I

A 30–40% solids slurry of lithopone in water is prepared and 2.3% of 42° Baumé sodium silicate, on the basis of dry pigment is added with agitation. Commercial calcium chloride (77.80% $CaCl_2$) is then added in amount of 0.9% by weight of the dry pigment and the slurry agitated for about 45 minutes. Thereafter the pigment is filtered, washed, and calcined in a direct fired calciner, and ground. The pigment thus produced showed substantially less settling than did lithopone given the same silicate treatment but which was not subjected to a carbonation treatment.

Example II 3575 grams of calcined lithopone was slurried in water and heated to 70° C. To this slurry was added 89.4 cc. of 40° Baumé sodium silicate containing .1162 gram of $Na_2O$ per cc. 25 grams of 75% calcium chloride was then added. The slurry was agitated and when the precipitation was complete carbon dioxide gas was passed through the slurry until the carbonation was complete. The pigment was then filtered, dried and ground.

In the above examples lithopone has been used as illustrative but other white pigments such as titanium dioxide may be used. Also, instead of white pigment, so called inerts such as calcite, calcium sulfate, barium sulfate, asbestine, china clays, etc. may be treated, as well as mixtures of the white pigments and inerts. In the case of mixtures, best results are obtained if the mixtures are treated, but if desired the pigments may be separately treated and then mixed. Or a treated pigment may be mixed with an untreated one with an improvement in the hiding of the composite. Other pigments such as cadmium sulfide may also be treated in accordance with the present invention.

The amount of silicated used in the treatment may vary. Sodium silicate is the most economical to use and when it is used the amount will preferably be between 0.5% and 10% by weight of the pigment treated. Less may be used although the results will not ordinarily warrant the treatment. Also more than 10%, as much as 20% or more may be used if desired. Other soluble silicates than sodium silicate may be used, equivalent amounts being used to produce the same amount of carbonated silicate in the finished pigment.

It is not necessary to completely convert the alkaline earth metal or zinc or other oxide in the precipitated silicate into carbonate, as decreased settling may be obtained with only partial carbonation.

Instead of directly forming the insoluble silicate by treatment of the soluble silicate with the precipitating salts, the soluble silicate may be first treated with an acid to form silicic acid, which may then be converted into the insoluble silicate by means of oxides which form insoluble silicates and which are converted into carbonates by carbon dioxide. Or the silicic acid may be used directly and this converted into the insoluble silicate.

The precipitating salts or/and oxides contemplated by the present invention are those which will produce an insoluble silicate, and the oxides of which are convertible into carbonates. Precipitating salts and oxides which have been found satisfactory are those of the alkaline earth metal group, including magnesium, and zinc.

In its broader aspects the present invention contemplates subjecting pigment containing an insoluble silicate containing an oxide of a metal convertible into carbonate, to a carbonation treatment and the pigment containing the carbonated insoluble silicate.

Having described the invention what is claimed is:

1. The process of treating pigments which comprises subjecting a pigment composition comprising a base pigment and an insoluble reaction product of a soluble silicate and a precipitating salt selected from the class consisting of alkaline earth metal salts and zinc salts to the action of carbon dioxide to convert the metal oxide present in the insoluble silicate into the corresponding carbonate.

2. The process of treating pigments which comprises forming an aqueous slurry of a base pigment, adding a soluble silicate to said slurry, precipitating the silicate in insoluble form by means of a soluble salt of metals selected from the class consisting of alkaline earth metals and zinc, and thereafter subjecting the pigment to the action of carbon dioxide to convert the metal oxide present in the insoluble silicate into the corresponding carbonate.

3. The process of treating pigments which comprises forming an aqueous slurry containing silicic acid and a base pigment, converting the silicic acid into an insoluble silicate selected from the class consisting of alkaline earth metal silicates and zinc silicate, and thereafter subjecting the pigment to the action of carbon dioxide to convert the metal oxide present in the insoluble silicate into the corresponding carbonate.

4. The process of treating pigments which comprises forming an aqueous slurry of a base pigment, introducing a soluble silicate into said solution in an amount equivalent to from about 0.5% to about 10% of sodium silicate based on the weight of pigment, precipitating the silicate in insoluble form by means of a precipitating salt therefore selected from the class consisting of salts of alkaline earth metals and zinc, and thereafter subjecting the pigment to the action of carbon dioxide to convert the metal oxide present in the insoluble silicate into the corresponding carbonate.

5. The process of claim 8 in which the base pigment is selected from the class consisting of white pigments, inert pigments and mixtures thereof.

6. The process of claim 8 in which the base pigment comprises a white pigment.

7. The process of claim 8 in which the base pigment comprises lithopone.

8. The process of improving a pigment composition comprising a base pigment and sufficient insoluble precipitated silicate of a metal selected from the class consisting of alkaline earth metals and zinc to improve the hiding power of the base pigment which comprises converting the metal oxide content of said insoluble silicate into the corresponding carbonate by the action thereon of $CO_2$.

9. The process of preparing extended pigments which comprises treating a mixture of a base pigment and an insoluble precipitated silicate of a metal selected from the class consisting of alkaline earth metals and zinc to the action of carbon dioxide to convert metal oxide present in the insoluble silicate into the corresponding carbonate.

10. A pigment resulting from the process comprising treating a mixture comprising a base pigment and an insoluble precipitated silicate of a metal selected from the class consisting of alkaline earth metals and zinc with carbon dioxide to convert metal oxide present in the insoluble silicate into the corresponding carbonate.

11. The pigment of claim 10 in which the base pigment is a pigment selected from the class consisting of white pigments and inert pigments.

12. The pigment of claim 10 in which the base pigment comprises white pigment.

13. The pigment of claim 10 in which the base pigment comprises lithopone.

14. The pigment of claim 10 in which the base pigment comprises titanium dioxide.

15. The pigment of claim 10 in which the base pigment comprises an inert pigment.

16. The pigment of claim 10 in which the amount of carbonated silicate corresponds to from about 0.5% to about 10% of sodium silicate by weight of the base pigment.

17. The method of improving an extended pigment composition comprising a base pigment and an insoluble silicate of a metal selected from the class consisting of alkaline earth metals and zinc precipitated in situ which comprises treating said pigment composition with carbon dioxide to convert metal oxide present in said insoluble silicate into the corresponding carbonate.

KENNETH S. MOWLDS.